United States Patent
Bardainne

(10) Patent No.: US 12,214,814 B2
(45) Date of Patent: Feb. 4, 2025

(54) METHOD FOR MONITORING THE PHYSICAL STATE OF A RAIL

(71) Applicant: SERCEL, Carquefou (FR)

(72) Inventor: Thomas Bardainne, Paris (FR)

(73) Assignee: SERCEL, Carquefou (FR)

( * ) Notice: Subject to any disclaimer, the term of this patent is extended or adjusted under 35 U.S.C. 154(b) by 146 days.

(21) Appl. No.: 18/005,870

(22) PCT Filed: Jul. 23, 2021

(86) PCT No.: PCT/FR2021/051381
§ 371 (c)(1),
(2) Date: Jan. 18, 2023

(87) PCT Pub. No.: WO2022/018388
PCT Pub. Date: Jan. 27, 2022

(65) Prior Publication Data
US 2023/0278606 A1     Sep. 7, 2023

(30) Foreign Application Priority Data
Jul. 24, 2020 (FR) ........................................ 2007822

(51) Int. Cl.
*B61L 23/04* (2006.01)
(52) U.S. Cl.
CPC .................................. *B61L 23/045* (2013.01)
(58) Field of Classification Search
CPC .................................................... B61L 23/045
See application file for complete search history.

(56) References Cited

U.S. PATENT DOCUMENTS

| 2001/0019263 A1* | 9/2001 | Kwun .................... G01N 29/11 324/217 |
| 2019/0232988 A1 | 8/2019 | Lang |

(Continued)

FOREIGN PATENT DOCUMENTS

| EP | 3509927 B1 | 10/2020 |
| WO | 2020021177 A1 | 1/2020 |
| WO | 2020025390 A1 | 2/2020 |

OTHER PUBLICATIONS

International Search Report/Written Opinion in related/corresponding PCT Application No. PCT/FR2021/051381 dated Nov. 15, 2021.

(Continued)

*Primary Examiner* — George C Jin
(74) *Attorney, Agent, or Firm* — PATENT PORTFOLIO BUILDERS PLLC

(57) ABSTRACT

The invention relates to a method for monitoring the physical state of a longitudinal element (IO) of a railway-type rail, the method having a step of detecting mechanical waves moving along the longitudinal element (IO), in particular due to the passing of a train, by means of an array of mechanical wave sensors placed along and in contact with the longitudinal element, the array having at least one first pair (A) of sensors each positioned at one end of a first portion (IOa) of the longitudinal element (IO), and a step of processing the signals emitted by the sensors in the array of sensors, the processing step having the determination of at least one first interfered signal determined from signals provided by the sensors in the first pair (A) of sensors over a first predetermined period of time.

15 Claims, 5 Drawing Sheets

(56) References Cited

U.S. PATENT DOCUMENTS

| | | | |
|---|---|---|---|
| 2019/0317056 A1* | 10/2019 | Druet | G01M 5/0016 |
| 2019/0346408 A1 | 11/2019 | di Scalea | |
| 2020/0001905 A1* | 1/2020 | Badolato Martin | B61L 25/021 |
| 2020/0130717 A1* | 4/2020 | Tsujita | B61L 3/12 |
| 2022/0135094 A1* | 5/2022 | Mesnil | G01N 29/2418 |
| | | | 246/120 |

OTHER PUBLICATIONS

Karim G. Sabra et al., "Using cross correlations of turbulent flow-induced ambient vibrations to estimate the structural impulse response. Application to structural health monitoring," The Journal of the Acoustical Society of America, May 8, 2007, vol. 121, No. 4, pp. 1987-1995.

* cited by examiner

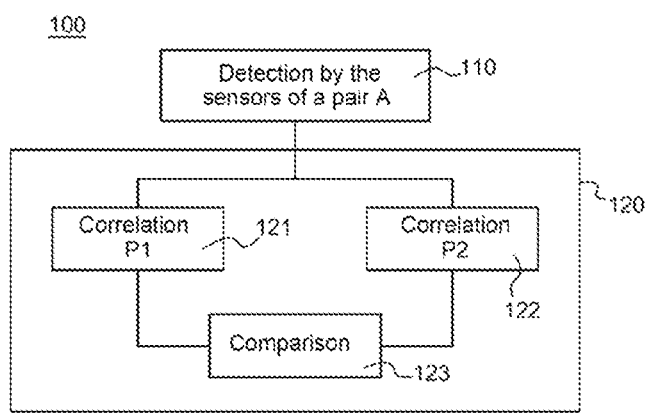
Fig. 2a
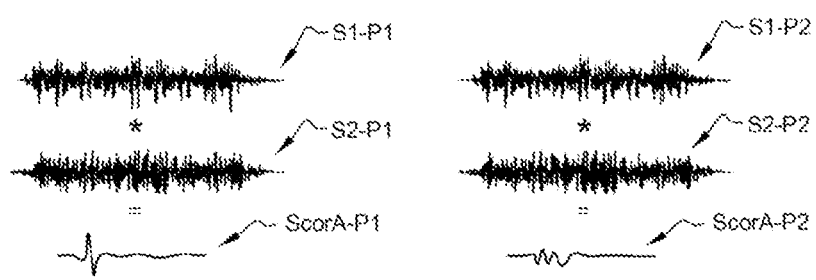
Fig. 2b     Fig. 2c

METHOD FOR MONITORING THE PHYSICAL STATE OF A RAIL

The present invention relates to a method for monitoring the physical state of a longitudinal element and a monitoring system for implementing this method.

Many systems or structures, such as buildings, bridges, elevators or railroad networks, comprise longitudinal elements, in particular made of metal, such as cables, rails, barriers or structural elements. These longitudinal elements are often used as a support or base for elements of the system and it is therefore important to ascertain the physical state of these longitudinal elements, in particular their state of wear, or changes in this physical state over time.

Changes in the physical state of these longitudinal elements may be due to the use made of them per se but may also result from exposure to variable weather conditions (sunshine, rain, frost, etc.) or to the ambient environment in which they are installed, for example in the case of submerged longitudinal elements.

Railroad rails, for example, wear out over time, on the one hand, owing to the repeated passage of trains and, on the other hand, owing to their exposure to weather conditions that can be extreme. In order to prevent the rails from breaking or cracking when a train passes, it is important to monitor their state of wear.

In the prior art, there are existing methods for monitoring rails. One such method currently used is the visual inspection of the rails. Another possible method for such monitoring in document EP3509927 is based on what is referred to as "passive" seismics, consisting in placing seismic wave sensors or other mechanical wave sensors near the rails to identify changes in the signals propagated by the ground which were generated by the mechanical waves related to the contact between the wheels of the train and the rail during the passage of the train.

However, these methods only make it possible to detect significant deterioration of the rail such as a crack, or indeed a break.

It would therefore be beneficial to have a solution making it possible to monitor the physical state of any type of longitudinal element, in particular with a view to studying the change in the physical state of this longitudinal element over time, as a function of the conditions to which this longitudinal element is or has been subjected, and to detect wear of this longitudinal element at an early stage.

Document WO 2020/025390 thus presents ways to study the state of railroad rails by means of guided waves in the rail. This document proposes fitting out the rail and the signal in response to the guided waves received by the sensors, in particular following the passage of a train, is processed to display a characteristic of the state of the rail on the basis of comparisons with values derived from theoretical or empirical models.

The invention relates, as first subject matter, to a method for monitoring the physical state of a rail or other longitudinal element, the method comprising:
- a step of detection of the mechanical waves moving along the longitudinal element by means of an array of mechanical wave sensors placed along and in contact with the longitudinal element, said array comprising at least a first pair of sensors each positioned at one end of a first portion of the longitudinal element, and
- a processing step comprising
  - determining a plurality of simplified traces, each simplified trace resulting from the interferometry of signals delivered by the sensors of the first pair over a predetermined time period,
  - determining at least a first and a second virtual traces, the first virtual trace corresponding to the sum of simplified traces determined during a first monitoring interval and the second virtual trace corresponding to the sum of simplified traces determined during a second monitoring interval, the first and the second monitoring intervals being different and each comprising a plurality of predetermined time periods, and
  - comparing at least the first virtual trace with the second virtual trace in such a way as to extract at least one piece of information on the physical state of the first portion.

The monitoring method of the invention makes it possible to monitor a longitudinal element, and in particular a rail of a railroad track, by virtue of the mechanical waves moving along the latter, and in particular by virtue of the trains using said rail. Since the sensors are placed along and in contact with the longitudinal element, they detect the mechanical waves directly, without these waves having passed through another material or medium such as the ground. The signal received by the sensors undergoes interferometry processing, and the interfered signal (or simplified trace) obtained is therefore only representative of the longitudinal element and contains few, if any, spurious signals, unlike known solutions in which sensors are placed at a distance from the longitudinal element and waves are transmitted via the ground.

In particular, in the case of a train traveling on a railroad track, when said train is at a given distance from a point on the rail (500 m for example), it generates waves which propagate in the waveguide constituted by the rail. This signal, which is very strong, is characterized by a propagation entirely located in the rail and therefore subject to carrying information on imperfections. The interferometry between the signals detected by two sensors placed on the rail over a period preceding the passage of the train (for example 30 seconds to one minute before), makes it possible to extract the propagation component of the signal, setting aside the component due to the source; this makes it possible to measure identified indicators such as the speed of propagation for example. Subsequently, the analysis of the temporal and spatial changes in these indicators allows the identification of a worn portion of the rail.

Moreover, it is possible to study portions of any length depending on where the sensors are placed.

In the invention, the interfered signals result from the application of an interferometry technique to the signals of a pair of sensors, in particular to a couple of signals, one of the signals of this couple coming from the first sensor of a pair and the other signal of this couple coming from the second sensor of the same pair. The interferometry technique applied may be, for example, cross-correlation (sometimes called correlation), convolution, deconvolution and/or any other interferometry method. The application of an interferometry technique advantageously makes it possible to obtain usable signals because this technique makes it possible to set aside the signature of the signal emitted/detected and to extract the propagation component of said signal.

According to the method of the invention, the signals measured on each occurrence of a guided wave may be accumulated over successive periods, and the comparison may be carried out for each of the periods. In particular, for a railroad rail, the simplified traces generated by a passing train are accumulated for a day, and the variation is evaluated by comparisons between days. This summation of signals makes it possible to simplify the mathematical processing and/or to use more robust or less accurate sensors, in particular DAS technology on optical fiber. The daily, weekly, or even monthly analysis of changes also facilitates "industrial" use of the invention.

The invention also relates, as second subject matter, to a system for monitoring the physical state of a rail or other longitudinal element, the system comprising:

an array of mechanical wave sensors placed along and in contact with the longitudinal element, said array comprising at least a first pair of sensors each positioned at one end of a first portion of the longitudinal element, and a system for processing the signals from the sensors of said array of sensors, the processing system being configured to determine a plurality of simplified traces by interferometry of signals delivered by the sensors of the first pair of sensors over a predetermined time period, calculate at least a first and a second virtual traces, the first virtual trace corresponding to the sum of simplified traces determined during a first monitoring interval and the second virtual trace corresponding to the sum of simplified traces determined during a second monitoring interval, the first and the second monitoring intervals being different and each comprising a plurality of predetermined time periods, and compare at least the first and the second virtual traces in such a way as to extract at least one piece of information on the physical state of the first portion.

BRIEF DESCRIPTION OF THE DRAWINGS

The invention is depicted in the attached drawings:

FIG. 2a shows a flowchart depicting a first monitoring method according to the invention;

FIG. 2b shows a first example of a signal obtained by the method of FIG. 2a;

FIG. 2c shows a second example of a signal obtained by the method of FIG. 2a;

FIG. 3b shows an example of signals obtained during the method of FIG. 3a;

FIG. 4a shows a flowchart depicting a monitoring method according to a third embodiment of the invention;

FIG. 4b shows an example of signals obtained during the method of FIG. 4a;

FIG. 4c shows an example of signals obtained during the method of FIG. 4a; and

DESCRIPTION OF EMBODIMENT(S)

For the sake of clarity, only the elements essential for an understanding of the invention have been shown schematically, and not to scale.

Similarly, in order to simplify the description, the preferred application of the invention is described, in relation to a railroad rail fitted out to detect the guided waves generated by the passage of trains. However, this is a non-limiting exemplary embodiment and the invention may be applied to any type of longitudinal element allowing the propagation of mechanical waves, in particular seismic or vibratory waves, the change in physical state of which it is desired to monitor. In the present invention, the mechanical waves are generated actively by a deliberate event which occurs on the longitudinal element such as for example an impact or friction, unlike systems which carry out passive monitoring using the waves from ambient noise.

Figure 1A:
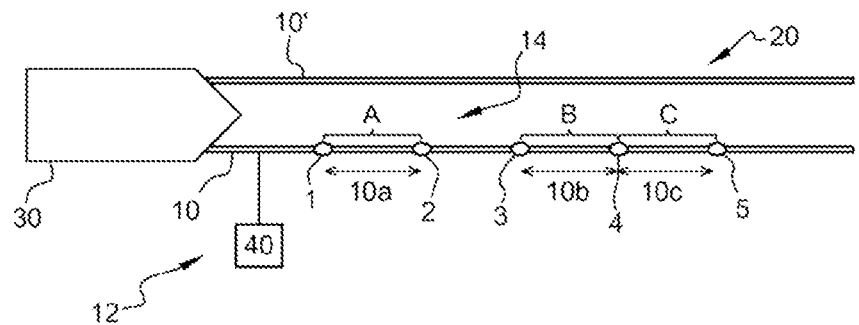
FIGS. 1a and 1b show a system for monitoring the physical state of a rail according to two embodiments of the invention.

The methods for monitoring the physical state of a longitudinal element according to the invention and the systems for implementing these methods will thus be described in the case where the longitudinal element to be monitored is a rail of a railroad track, for example, the first rail 10 shown in FIG. 1a forming with a second rail 10' a railroad track 20 over which a train 30 can move.

The rail 10 may be linear or curved, the curvature possibly being in a first and/or in a second direction, the first direction being horizontal and perpendicular to the longitudinal axis of the rail 10 and the second direction being vertical and perpendicular to the longitudinal axis of the rail 10.

To allow monitoring of the state of at least a first portion 10a of the rail 10, a system 12 for monitoring the physical state of the rail 10 according to the invention comprises:

an array 14 of mechanical wave sensors placed along and in contact with the rail 10, the array 14 comprising at least a first pair A of sensors 1 and 2 positioned at each end of the first portion 10a of the rail 10, and a system 40 for processing the signals from the sensors of said array 14 of sensors.

In the example shown in FIG. 1a, the array 14 further comprises a second pair B of sensors formed by a third sensor 3 and a fourth sensor 4 each placed at one end of a second portion 10b of the rail 10, and a third pair C of sensors formed by the fourth sensor 4 and a fifth sensor 5 each placed at one end of a third portion 10c of the rail 10.

In the example shown, the sensors of the array 14 are integrated in discrete receivers positioned regularly and spaced apart by a constant distance, for example a distance that may range from one meter to a few tens of meters. This regular distribution is advantageously chosen over the entire length of the rail which is subject to the same conditions of wear. In a variant not shown, the sensors, or the receivers comprising the sensors, may be distributed irregularly, over all or part of the rail. A different distribution of the sensors, at least over certain lengths of the rail, may be beneficial to take into account the fact that certain parts of the rail are likely to be subject to greater conditions of wear, such as bend areas, for example.

In the present invention, a discrete receiver comprises a sensor as well as a transmission/recording unit, and makes it possible to measure and record the mechanical waves and then to transmit the recorded data to the processing system 40.

Each of the sensors of the array 14 of sensors may be chosen from sensors based on proven technology such as geophone, accelerometer and/or other mechanical wave sensors. In a preferred embodiment, all the sensors of the array 14 of sensors may be identical so as to simplify processing and maintenance. According to another possible embodiment, the sensors of the array 14 of sensors may be a mixture of different sensors. The sensors may be chosen for example on the basis of their robustness, their size, the ease of deployment and the required reliability: thus, for example, an array of identical microsensors (known as Micro-Electro-Mechanical Systems or MEMS) may be preferred.

Figure 1B:
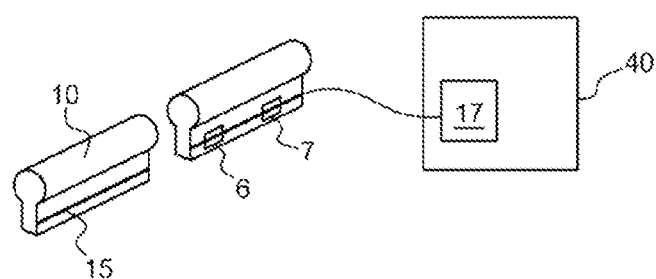

In another embodiment shown in FIG. 1b, the array 14 of sensors is produced at least partially using an optical fiber 15 secured to the rail and associated with a distributed acoustic sensing (DAS) device 17 which is integrated in the processing system 40. DAS technology, which is known to those skilled in the art, makes it possible to use the optical fiber as a set of equivalent sensors positioned at predefined intervals along the path of the fiber.

The advantage of DAS technology is that the optical fiber 15 may extend over several tens or even hundreds of kilometers along the rail 10 or any other longitudinal element and has a low cost. Furthermore, the position of each of the equivalent sensors along the optical fiber is not fixed in time and may be chosen according to the type monitoring to be carried out. To be specific, mechanical waves along the rail are detected over the entire length of the optical fiber, and it is during the processing step that the position of each of the equivalent sensors is decided according to the portion or portions to be monitored. DAS technology associated with the use of optical fiber thus offers great flexibility of use. As for embodiments using discrete sensors, the DAS device may be configured such that the equivalent sensors are positioned regularly, irregularly, or alternately regularly and irregularly.

Any combination of sensors may be used. It is possible for example to place an optical fiber 15 along the rail 10 on a first part of the rail and to place discrete sensors on a second part of the rail. It is also possible to place an optical fiber over the entire length of the rail or over part of the length of the rail 10 and to position discrete sensors 6, 7 even in certain zones of the part covered by the optical fiber.

According to an embodiment described below, the two sensors of one and the same pair of sensors are two identical accelerometers.

The sensors 1 to 5 are mechanically coupled to the rail 10, preferably by direct contact. Thus, they may directly detect mechanical, seismic or vibratory waves moving along the rail. The mechanical waves that can be detected are for example generated by a source which is, in this embodiment, the train 30 as it moves over the railroad track 20.

Each of the sensors of the array 14 is connected to a system for processing the signals detected. In the embodiment shown, the processing system is represented by a processing system 40 connected (by wires or wirelessly) to each of the sensors of the array 14 which consequently receives the signals detected by each of the sensors of the array. The processing system 40 may include a physical central unit, or may be implemented via the Internet (known as "Cloud Computing"). The processing system 40 may also include processing elements embedded directly in the sensors of the array 14. Indeed, the processing system 40 may have any mixed configuration, with embedded processing, cloud computing and/or a central unit, making it possible to carry out processing of the signal integrated in the invention. When the system uses DAS technology associated with an optical fiber 15 as shown in FIG. 1b, the processing system 40 is associated with the distributed acoustic sensing DAS device 17.

Each sensor detects the mechanical waves over a predetermined duration and the corresponding signal is transmitted to the processing system 40. Detection may be programmed and be carried out, for example for a period of 60 s ranging from 90 seconds to 30 seconds before the trains pass over the pair of sensors. Alternatively and depending on the processing means and the nature of the sensors, detection may be continuous (with or without sampling) and the signal fraction "of interest" for the remainder of the method according to the invention is retained in the processing system 40. The processing system 40 comprises means for carrying out a step of interferometry of the signals received over a predetermined time period; for example, the interferometry is carried out on a signal portion with a duration of approximately one minute shortly before the passage of the train, to take advantage of a strong and useful signal without saturating the sensors, then only one to a few seconds of correlated signal may be retained for this passage of a train, for each pair of sensors.

The system 12 makes it possible to implement three methods for monitoring the physical state of the rail 10, these three methods having in common:
  a step of detection of the mechanical waves moving along the rail 10 by means of the array 14 of mechanical wave sensors placed along and in contact with the rail 10, said array 14 comprising at least the first pair A of sensors 1 and 2 each positioned at one end of the first portion 10a of the rail 10, and
  a step of processing the signals from the sensors 1 and 2 of said array 14 of sensors, said processing step comprising determining at least a first interfered signal resulting from the application of an interferometry technique, for example a cross-correlation, to signals delivered by the sensors 1 and 2 of the first pair A of sensors over a first predetermined time period P1.

The application of an interferometry method makes it possible to obtain usable signals, setting aside the signature of the source (i.e. of the train); in particular, interfered signals (or simplified traces) are obtained by applying interferometry to two signals from a pair of sensors.

To construct these simplified traces (or interfered signals), use may be made of cross-correlation (sometimes called correlation), convolution, deconvolution and/or any other interferometry method. In the exemplary embodiments which will be described, the interferometry technique used is cross-correlation (or correlation).

The first and the second sensors each detect a set of mechanical waves moving along the rail 10, said waves being generated by a train or any other locomotive moving over the rail at least during the first time period P1. Each of the sensors 1 and 2 of the first pair A thus delivers a signal corresponding to the set of mechanical waves detected, which is transmitted to the processing system 40.

The processing system 40 then generates a first cross-correlated signal resulting from a first interferometry step from the signals delivered by the sensors of the first pair A of sensors 1 and 2 over a first predetermined time period P1. This interferometry step is preferably carried out by cross-correlation, but any other method would be suitable; the aim here is to set aside the signature of the signal emitted/detected and to extract the propagation component of said signal. Thus, by virtue of this step, the signal is decorrelated from the nature of the train as source such that it will be possible to follow the evolution thereof even if the source changes. The cross-correlation of the signals from the first sensor 1 and from the second sensor 2 therefore makes it possible to obtain a first deconvoluted signal from the signature of the source, this signal representing a simplified trace, which is repeatable, of the propagation of the mechanical waves within the rail.

The first interfered signal determined at the end of the processing step makes it possible to extract one or more pieces of information on the physical state of the portion 10a during the first time period P1. In particular, the first signal may provide information on the physical state of the portion 10a at a given instant which corresponds to the first time period.

A time period according to the invention corresponds to a fraction of the total duration of detection (or monitoring interval) of the mechanical waves by the sensors of a pair of sensors. This time period may be more or less long depending on the desired quality of the signal and on the quantity and/or intensity of the mechanical waves detected by the sensors. The detection time itself depends on the nature of the monitoring. The duration of a time period is generally a few seconds which make it possible to obtain a simplified trace by interferometry. On the other hand, the duration for which the sensors detect the signal may be longer and depend in particular on the duration of the monitoring interval, which may be several hours, days or months. It is possible to process only some of the waves detected by the sensors.

A first method 100 that may be implemented using the system 12 is shown in FIG. 2a. This first method allows monitoring of the physical state of a single portion of the rail 10 over time and will be described for the first portion 10a.

The method 100 comprises the step of detection 110 of the mechanical waves moving along the rail 10, and in particular along the first portion 10a, by the first pair A of sensors 1 and 2. The method 100 also comprises the processing step 120 comprising determining a first simplified trace, that is to say a first cross-correlated signal $S_{corA-P1}$ resulting from a first cross-correlation of a signal $S_{1-P1}$ delivered by the first sensor 1 and a signal $S_{2-P1}$ delivered by the second sensor 2, over the first time period (FIG. 2b).

According to the method 100, the processing step further comprises:
  determining at least a second simplified trace, that is to say a second cross-correlated signal $S_{corA-P2}$ resulting from a second cross-correlation of signals $S_{1-P2}$ and $S_{2-P2}$ delivered by the sensors of the first pair A over a second predetermined time period P2 (FIG. 2c); and
  comparing 123 the first cross-correlated signal $S_{corA-P1}$ and the second cross-correlated signal $S_{corA-P2}$ in such a way as to obtain at least one piece of information on the physical state of the first portion 10a.

According to this method, the processing system 40 is configured to determine the first cross-correlated signal $S_{corA-P1}$ and the second cross-correlated signal $S_{corA-P2}$ and to compare the first cross-correlated signal $S_{corA-P1}$ with the second cross-correlated signal $S_{corA-P2}$ in such a way as to extract at least one piece of information on the physical state of the first portion 10a.

The comparison between the first cross-correlated signal $S_{corA-P1}$ and the second cross-correlated signal $S_{corA-P2}$ carried out by the processing system 40 makes it possible in particular to evaluate the change in the physical state of the first portion 10a between the first time period P1 and the second time period P2. This comparison may be performed visually, or automatically by any known method, such as a correlation calculation.

If the two signals are identical at the end of this comparison, the method 100 makes it possible to conclude that the physical state of the first portion 10a has not changed between the period P1 and the period P2. Conversely, if the two signals are not identical, the method 100 makes it possible to ascertain that the physical state of the first portion 10a has changed between the first period P1 and the second period P2. It is then possible to link this signal change with changes in certain parameters between the periods P1 and P2 such as for example a difference in weather conditions or a long period of elapsed time which may indicate wear of the rail along this portion.

The duration and the time of day (or of the week, of the month, etc.) of the time periods P1 and P2 may be chosen according to the information that it is desired to obtain on the physical state of the first portion 10a of the rail 10. Depending on whether it is desired to ascertain, for example, the change in the physical state of the rail during a day as a function of sunshine, temperature, humidity, etc., each of the periods P1 and P2 may range from several minutes to one or two hours.

According to one embodiment, the sensors 1 and 2 of the first pair A may record the mechanical waves moving along the rail continuously, or sampled at constant frequency, during a predetermined recording phase and the time periods P1 and P2 are selected in this recording phase. In other words, the phases P1 and P2 each constitute a time fraction of the recording phase. According to this first variant associated in particular with the use of DAS technology 17 associated with the optical fiber 15 as array 14 of sensors, the recording phase may have a duration ranging from several seconds to several years.

According to another embodiment, the sensors 1 and 2 of the first pair A may record the mechanical waves moving along the rail only during the predetermined periods P1 and P2.

The periods P1 and P2 may be spaced apart by a duration that may range from a few seconds to a few months or, on the contrary, they may follow one another without interruption.

The first method 100 is preferably repeated so as to obtain continuous monitoring of the state of the rail and it may therefore be repeated an unlimited number of times.

Figure 3A:
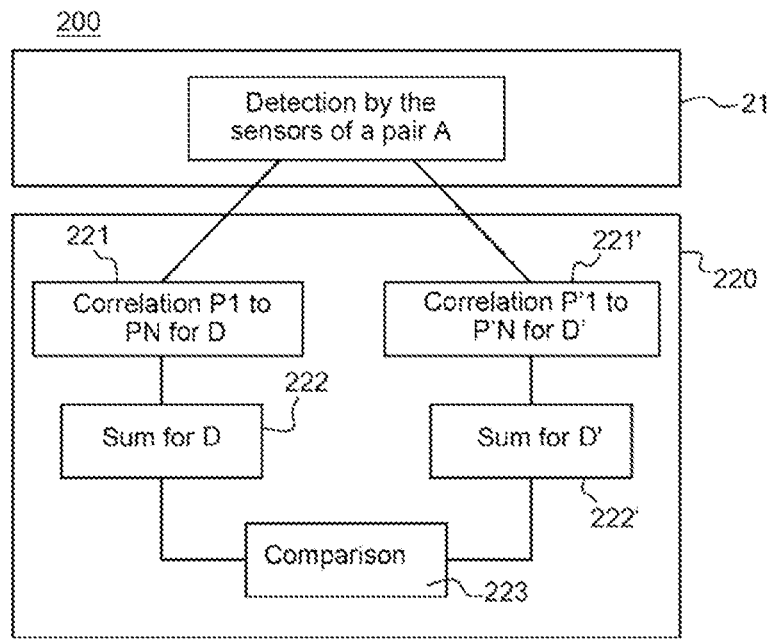
FIG. 3a shows a flowchart depicting a monitoring method according to a second embodiment of the invention.

A second method 200 shown in FIG. 3a may also be implemented by means of the monitoring system 12.

The second method 200 makes it possible to monitor the rail 10, and in particular to study the change in its physical state over several durations each comprising a plurality of time periods. This method according to the invention may make it possible, for example, to monitor a portion of a rail day after day.

The second method 200 comprises the step of detection 210 of the mechanical waves moving along the rail 10, said waves being generated by a train or other locomotive moving over said rail, by the first pair A of sensors 1 and 2. Preferably, detection is carried out just before the passage of the train directly over the first portion 10a in order to avoid saturation of the pair of sensors A, for example a few tens of seconds before the train arrives at the first portion. The second method 200 also includes the processing step 220 comprising:
  determining 221 a plurality of cross-correlated signals $S_{corA-P1-PN}$ corresponding to a cross-correlation of signals delivered by the sensors of the first pair A over a plurality of time periods (of identical or different durations, for example 1 second, before the passage of trains), the set of time periods forming a monitoring interval of duration D. The processing system 40 thus comprises a memory for storing successive recordings of simplified traces.

The processing step also includes the sum 222 of the simplified traces, optionally normalized, in order to obtain a virtual trace $S_{somA1-P1-PN}$ for the monitoring interval.

The second monitoring method comprises repeating this processing for other monitoring intervals, of identical or different durations, the simplified traces being obtained on identical or different criteria.

Figure 3B:
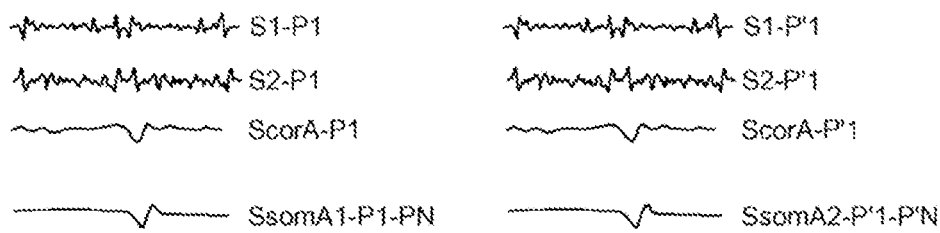

In particular, the processing step 220 includes determining 221' a second plurality of cross-correlated signals $S_{corA-P'1-P'N}$ corresponding to a correlation of signals delivered by the sensors of the first pair A over a second plurality of time periods, as well as the sum 222' of the signals of the second plurality of cross-correlated signals $S_{corA-P'1-P'N}$ making it possible to obtain a second virtual trace $S_{somA2-P'1-'PN}$ for the second monitoring interval, of duration D' (FIG. 3b).

The processing step 220 then includes a comparison step 223 for comparing the first and the second virtual traces with each other.

Figure 3C:
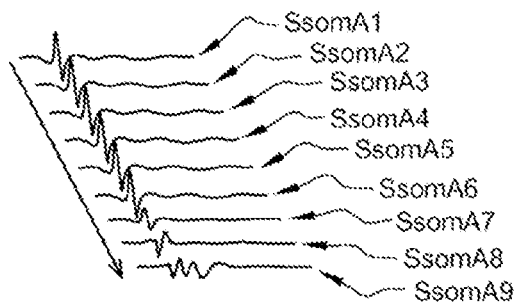
FIG. 3c shows an example of application of the second monitoring method of the invention.

According to an example of application of the method 200 shown in FIG. 3c, the method is carried out for nine monitoring intervals making it possible to obtain the nine virtual traces $S_{som-A1}$ to $S_{som-A9}$ which may be compared with each other to identify the change in the state of the rail 10. In particular, comparing the virtual traces $S_{som-A1}$ to $S_{som-A9}$ makes it possible to ascertain that the signal changes during monitoring intervals 1 to 9, and therefore that the physical state of the rail has been modified during these monitoring intervals. Thus, the beginning of wear is observed in the virtual trace $S_{som-A7}$, this wear continuing thereafter. According to one possible embodiment, the method may comprise an alert step for raising the alarm if the signal, or the difference between the signal and the "normal" average, exceeds a certain threshold.

In this exemplary embodiment, each monitoring interval lasts 1 month and the method therefore makes it possible to study the change in the physical state of the rail 10 over 9 months. The continuous variation in the virtual traces $S_{som-A1}$ to $S_{som-A9}$ over the 9 months visible in FIG. 3c may for example mean that the rail 10 has worn out over time on the portion 10a. According to another exemplary embodiment, each monitoring interval may last 1 hour and the method may thus make it possible to study the change in the physical state of the rail over 9 hours. If the monitoring intervals go from 5 a.m. to 2 p.m. in a period of extreme heat, the change in the physical state of the rail may mean that the rail has expanded under the effect of the heat. Furthermore, if, the next day, the signal shows the same change over time or there is further continuous deterioration, it is possible to consider the change as "normal" or to generate an alarm.

According to this second method 200, a time period P may for example correspond to the passage of a train over the rail 10 and each monitoring interval may be one day. Thus, at the end of one day, a first virtual trace $S_{SomA1-P1-PN}$ is obtained, the quality of which is improved compared to the cross-correlated signal obtained upon each passage of a train, and the method may make it possible to carry out daily monitoring in the case where the method is repeated over several days, weeks, months, etc. Note that the virtual traces may comprise a different number of occurrences (or of simplified traces), it moreover being possible for the signals to have been obtained over time periods of different duration. By virtue of the choice according to the invention of cumulative interferometry, it is thus possible to simplify monitoring for the operators, it being possible to select the conditions for recording the signals according to parameters inherent in the use of the infrastructure, in this case in the context of train traffic: the railroad operator provides the timetables for the trains (possibly the times of the day or of the year that it considers representative), and processing is carried out for the periods determined on this basis. Any modification to the train schedule, whether temporary (traffic hazard) or permanent (change of season) may be taken into account directly by the system according to the invention, by adapting the time periods Pi for determining simplified traces 221, 222.

According to this second method, the processing system 40 is configured to
calculate the sum of the cross-correlated signals for a duration comprising several time periods, and
compare the first virtual trace $S_{somA1-P1-PN}$ with the second virtual trace $S_{SomA2-P'1-P'N}$ in such a way as to extract at least one piece of information on the change in the physical state of the first portion 10a between two moments (or durations).

The system and the method may of course be adapted to repeat the comparisons with more than two virtual traces as shown in FIG. 3c described above.

In particular, it is possible to associate the passage of trains with the recording of the signals detected by the pairs of sensors: 90 seconds before the passage of the train, the signals detected by the pairs of sensors are transmitted for one minute to the processing system 40. The processing system 40 then performs a cross-correlation between at least a fraction of the signals from the pair of sensors and stores the result. At the end of the day, the processing system calculates the sum of the signals recorded, to obtain a first virtual trace that it may normalize, by virtue of a spectral whitening step for example. The daily virtual traces are then compared in order to assess a change in the physical state of the portion of rail.

This method is particularly suitable for sensors of the optical fiber type associated with a DAS device which records continuously, the summation amplifying the signal. Furthermore, depending on the changes observed between the virtual traces, it is possible to redefine the position of the equivalent sensors for greater accuracy.

A third method 300 shown in FIG. 4a may also be implemented by means of the monitoring system 12.

Figure 4B:
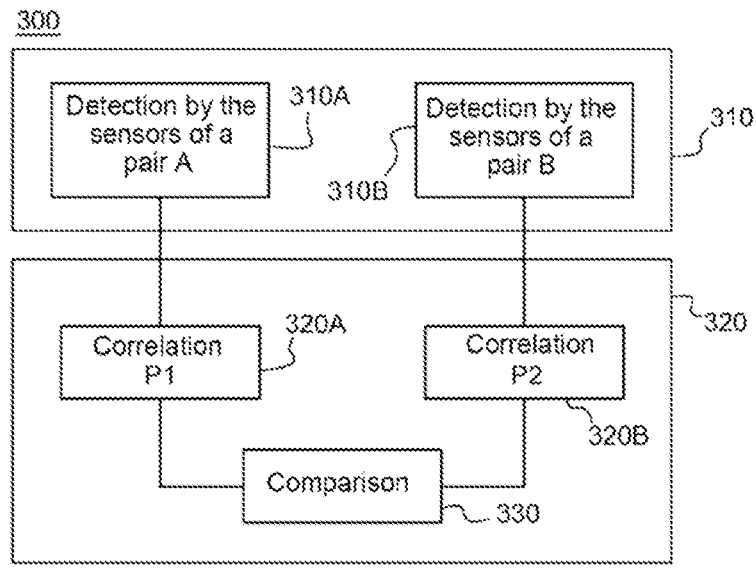

The third method 300 comprises the step of detection 310 which includes detection 310A of the mechanical waves moving along the rail 10, and in particular along the first portion 10a, by the first pair A of sensors 1 and 2. The method 300 further comprises the processing step 320 comprising determining a first cross-correlated signal $S_{corA-P1}$ resulting from a first cross-correlation of a signal $S_{1-P1}$ delivered by the first sensor 1 and a signal $S_{2-P1}$ delivered by the second sensor 2, over the first time period (FIG. 4b).

Figure 4C:
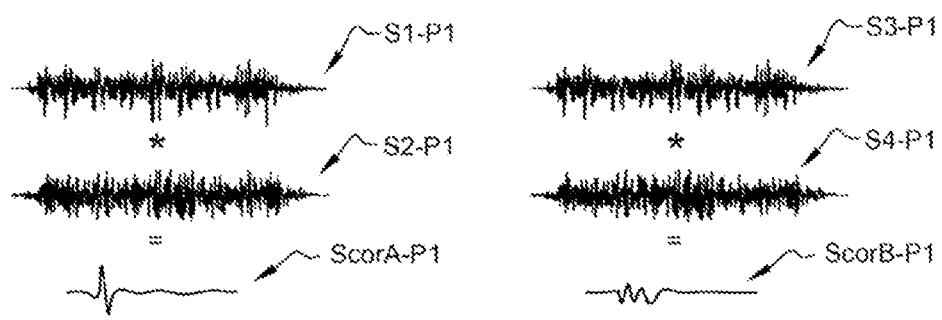

According to the third method 300, the step of detection 310 also includes detection 310B of the mechanical waves by means of the second pair B of sensors 3 and 4 of the array 14. In addition, the processing step further includes:
determining 320B at least a second cross-correlated signal $S_{corB-P1}$ resulting from a second correlation of signals $S_{3-P1}$ and $S_{4-P1}$ delivered by the sensors of the second pair B of sensors over the first time period P1 (FIG. 4c), and
comparing 330 the first cross-correlated signal $S_{corA-P1}$ with the second cross-correlated signal $S_{corB-P1}$ in such a way as to extract at least one piece of information on the physical state of the first portion 10a and/or of the second portion 10b.

According to this third method, the processing system 40 is configured to
determine at least the second cross-correlated signal $S_{corB-P1}$, and
compare the first cross-correlated signal $S_{corA-P1}$ with the second cross-correlated signal $S_{corB-P1}$ in such a way as to extract at least one piece of information on the physical state of the first portion 10a and/or of the second portion 10b.

In the case where the first and second cross-correlated signals $S_{corA-P1}$ and $S_{corB-P1}$ are different, it is possible to conclude that one of the two portions is more worn or is more damaged than the other owing to the conditions, for example weather conditions or conditions of use, to which the two portions are subjected. The comparison may be performed in a manner similar to that described above. Conversely, in the case where the two signals are identical, it is possible to conclude that the two portions exhibit the same state of wear and/or the same changes following exposure to particular conditions of temperature, humidity, etc.

This third method has been described in the case where the first and the second portions are spaced apart as is the case for the portions 10a and 10b. However, this method 300 may also be applied to a system in which the first and the second portions are contiguous and in which one of the sensors of the sensor array is common to the first and to the second pair. As shown in FIG. 1, the first portion may be the portion 10b and the second portion may be the portion 10c. In this case, the first and the second portions have in common the fourth sensor 4 which constitutes the second sensor of the pair B and the first sensor of the pair C.

The method 300 is not limited to two rail portions and may on the contrary be applied to a greater or lesser number of portions. According to one exemplary embodiment, the method 300 may be applied to the system 12 shown in FIG. 1 which comprises the first portion 10a, the second portion 10b and a third portion 10c.

According to this embodiment, the three portions 10a, 10b and 10c are identical. The implementation of the method 300 to these three portions may make it possible to obtain a signal for each of the portions, it then being possible to compare the three signals. For example, obtaining two identical signals and a third signal different from the other two may indicate the presence of at least one anomaly (wear, breakage, deformation, etc.) in one of the three portions. In the case where three different signals are obtained, the three portions or two of the three portions may exhibit one or more anomalies.

According to one embodiment, it is possible to carry out the daily monitoring described above (according to the second method) in such a way as to monitor the physical state of each of the portions over the course of the days and also to see if the physical state of one or more portions changes in a different manner to the other portions over the course of the days. In the various embodiments which have been described, the sensors were placed only along the rail 10 of the track 20. However, the sensors may be placed on the two rails 10 and 10' of the track 20, with the same distribution or with a different distribution.

Figure 5:
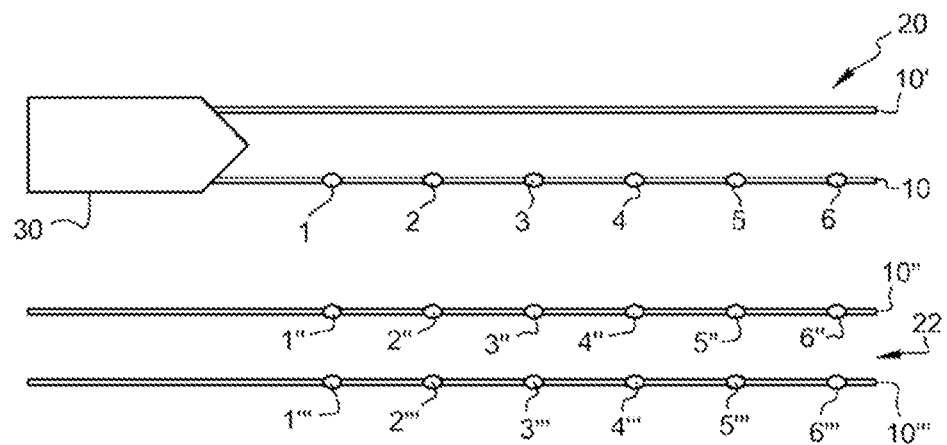
FIG. 5 shows an additional monitoring method that can be performed using at least part of the system of FIG. 1.

In addition to the embodiments described above, the waves emitted by the train 30 passing over the track 20 may be used to monitor the subsoil between two rails 10" and 10'" of a track 22 which extends parallel to the track 20 according to the method described in patent application WO2020/021177. To this end, pairs of sensors 1"-1'" to 5"-5'" may be placed on rails 10" and 10'" of the track 22 (FIG. 5). When the train 30 passes over the track 20 and in the absence of a train passing over the track 22, the pairs of sensors placed on the track 22 make it possible to monitor the subsoil between the rail 10" and the rail 10'" by interferometry. In the same way, monitoring of the subsoil between the two rails 10 and 10' of the track 20 could be carried out by placing sensors on the rail 10' and using the waves emitted by a train passing over the track 22.

This combination permitted by the invention is particularly advantageous from an economic point of view, the profitability of fitting out of the railroads being thus increased. In addition, the geophysical imagery of the subsoil thus produced is as close as possible to the rails and allows a focus under the track itself. This is a major advantage for increasing the resolution and positioning of the image.

Furthermore, in addition to the embodiments described above, the sensors 1 to 5 of the rail 10 (or in general the sensors placed on a rail and allowing the implementation of the methods of the invention) may also be used to perform a modal analysis of the rail along which they are placed. The modal analysis method is known to those skilled in the art and allows in particular the study of the dynamic model of the rail along which the sensors are placed.

In addition to the embodiments described above and when the sensor array is formed by an optical fiber, the optical fiber may be used to measure the deformation of the longitudinal element against which it is placed, for example a railroad rail. To this end, the optical fiber is associated with a DAS device.

According to one possible embodiment, the method 300 may be carried out for a certain number of initial portions, for example with a length of 100 meters. When an anomaly is identified on one of these initial portions, a more detailed analysis may be carried out by dividing this initial portion into several secondary portions, for example with a length of 10 meters in order to identify the secondary portion or portions responsible for the anomaly in the initial portion. The initial fitting out of the track may include sensor systems which are "dormant" at first; advantageously, it is the programming of the DAS device which is modified to allow finer segmentation. If more detailed continuous monitoring is envisaged for a portion, it is also possible to add sensors later, within an array of discrete sensors or in combination with an installed optical fiber.

According to one possible embodiment, the first method 100 and the second method 200 may be combined. To this end, it is possible to carry out the monitoring method for several time periods, and for several portions. It is thus possible to compare the signals of several portions, and to do so for several time periods, which may make it possible to study the change in the physical state of each portion over time and also to compare the portions with each other in order to detect any anomalies. Likewise, it is possible to combine the second and third methods in order to monitor several portions for different monitoring intervals.

The methods 100, 200 and 300 of the invention, whether taken alone or in combination, thus make it possible to carry out detailed measurements of slight changes in the physical state of a rail and therefore to provide a regular diagnosis, for example daily, of the physical state of a rail. Advantageously, the method of signal correlation by interferometry makes it possible to extract the propagation component of the signal while setting aside the component due to the source. It is then possible to measure identified indicators of the signal such as the speed of propagation, the amplitude, the shape of the wave, the resonance frequency, etc. and to do so for each portion monitored. The analysis of the changes in these indicators over several time periods for a given portion of the rail and/or for different portions of the rail allows the identification of a worn portion of the rail.

In the embodiment which has just been described, the longitudinal element is a rail and the train or trains passing over the rail are used as a source of mechanical waves. However, the longitudinal element may be any type of longitudinal element associated with a source of mechanical waves such as for example cables of a suspension bridge or a structural element of a bridge for which the source of mechanical waves may be the passage of cars over the bridge, or an elevator cable for which the source of mechanical waves may be the movement of the elevator.

According to other embodiments, the longitudinal element may not be associated with a source of mechanical waves owing to its use and a source of mechanical waves may then be added to implement the method according to the invention. The source may then be any type of device causing shocks and/or vibration on the longitudinal element such as for example a device tapping on the longitudinal element at a regular or irregular frequency.

The invention claimed is:

1. A method for monitoring the physical state of a longitudinal element, wherein it comprises:
    a step of detection of the mechanical waves moving along the longitudinal element by means of an array of mechanical wave sensors placed along and in contact with the longitudinal element, said array comprising at least a first pair (A) of sensors each positioned at one end of a first portion of the longitudinal element, and
    a processing step comprising:
        determining a plurality of simplified traces ($S_{corAP1-Pi}$), each simplified trace ($S_{corAPi}$) resulting from the interferometry of signals ($S_{1-P1}$, $S_{2-P1}$) delivered by the sensors of the first pair A over a predetermined time period (Pi),
        determining at least a first and a second virtual traces ($S_{somA1}$, $S_{somA2}$), the first virtual trace ($S_{somA1}$) corresponding to the sum of simplified traces determined during a first monitoring interval and the second virtual trace ($S_{somA2}$) corresponding to the sum of simplified traces determined during a second monitoring interval, the first and the second monitoring intervals being different and each comprising a plurality of predetermined time periods, and
        comparing at least the first virtual trace ($S_{somA1}$) with the second virtual trace ($S_{somA2}$) in such a way as to extract at least one piece of information on the physical state of the first portion.

2. The method as claimed in claim 1, wherein the interferometry consists of cross-correlation.

3. The method as claimed in claim 1, wherein—the array of sensors comprises an optical fiber associated with a distributed acoustic sensing (DAS) device, said first pair of sensors being defined on the optical fiber by the DAS system during the processing step.

4. The method as claimed in claim 1, wherein the determination of the virtual traces comprises a normalization step.

5. The method as claimed in claim 4, wherein the normalization step is carried out by spectral whitening.

6. The method as claimed in claim 1, wherein the detection of the mechanical waves is carried out continuously.

7. The method as claimed in claim 1, wherein it is carried out for a plurality of pairs of sensors.

8. The method as claimed in claim 1, wherein the monitoring intervals are of identical duration, in particular equal to one day.

9. The method as claimed in claim 1, wherein the longitudinal element is a rail of a railroad track, the mechanical waves detected corresponding to the passage of a train over said rail.

10. The method as claimed in claim 9, wherein each time period corresponds to the passage of a train over the rail, detection being carried out before the train arrives at the first portion.

11. A system for monitoring the physical state of a longitudinal element, wherein it comprises:
    an array of mechanical wave sensors placed along and in contact with the longitudinal element, said array comprising at least a first pair of sensors each positioned at one end of a first portion of the longitudinal element, and
    a system for processing the signals from the sensors of said array of sensors, the processing system being configured to
        determine a plurality of simplified traces ($S_{corAP1-Pi}$) by interferometry of signals ($S_{1-P1}$, $S_{2-P1}$) delivered by the sensors of the first pair of sensors over a predetermined time period (Pi)
        calculate at least a first and a second virtual traces ($S_{somA1}$, $S_{somA2}$), the first virtual trace ($S_{somA1}$) corresponding to the sum of simplified traces determined during a first monitoring interval and the second virtual trace ($S_{somA2}$) corresponding to the sum of simplified traces determined during a second monitoring interval, the first and the second monitoring intervals being different and each comprising a plurality of predetermined time periods, and
        compare at least the first and the second virtual traces in such a way as to extract at least one piece of information on the physical state of the first portion.

12. The system as claimed in claim 11, wherein at least one sensor of the array of sensors is a geophone or an accelerometer.

13. The system as claimed in claim 11, wherein the array of sensors is produced at least partially using an optical fiber associated with a distributed acoustic sensing (DAS) device.

14. The system as claimed in claim 11, wherein the system comprises a source of mechanical waves configured to generate the mechanical waves detected by the array of sensors.

15. The system as claimed in claim 11, wherein the longitudinal element is a rail of a railroad track, and in that the array of sensors is capable of detecting the mechanical waves generated by the passage of at least one train over the track.

* * * * *